(12) United States Patent
Hong et al.

(10) Patent No.: US 7,567,003 B2
(45) Date of Patent: Jul. 28, 2009

(54) COOLING FAN

(75) Inventors: Chien-Long Hong, Tu Cheng (TW);
Zhi-Ya Yang, Shenzhen (CN);
Zhen-Neng Lin, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 93 days.

(21) Appl. No.: 11/308,774

(22) Filed: May 2, 2006

(65) Prior Publication Data
US 2007/0257571 A1 Nov. 8, 2007

(51) Int. Cl.
H02K 5/16 (2006.01)
H02K 7/08 (2006.01)

(52) U.S. Cl. .................. 310/90; 310/67 R
(58) Field of Classification Search ............ 310/90, 310/67 R
See application file for complete search history.

(56) References Cited

U.S. PATENT DOCUMENTS

| | | | |
|---|---|---|---|
| 3,357,756 A * | 12/1967 | Fehr | 310/90.5 |
| 3,749,954 A * | 7/1973 | Anderson, Jr. | 310/90 |
| 4,647,803 A * | 3/1987 | von der Heide et al. | 310/51 |
| 4,655,616 A * | 4/1987 | Ducan | 384/446 |
| 4,968,910 A * | 11/1990 | Meier et al. | 310/42 |
| 4,980,587 A * | 12/1990 | Yonei et al. | 310/67 R |
| 4,996,613 A * | 2/1991 | Hishida | 360/99.08 |
| 5,059,844 A * | 10/1991 | Anstine | 310/90 |
| 5,126,610 A * | 6/1992 | Fremerey | 310/90.5 |
| 5,235,227 A * | 8/1993 | Fazekas | 310/51 |
| 5,323,076 A * | 6/1994 | Hajec | 310/90 |
| 5,441,386 A * | 8/1995 | Hsieh | 415/230 |
| 5,659,445 A * | 8/1997 | Yoshida et al. | 360/98.07 |
| 5,715,116 A * | 2/1998 | Moritan et al. | 360/99.08 |
| 5,885,005 A * | 3/1999 | Nakano et al. | 384/113 |
| 6,023,114 A * | 2/2000 | Mori et al. | 310/90 |
| 6,084,328 A * | 7/2000 | Yamashita et al. | 310/90 |
| 6,316,856 B1 * | 11/2001 | Kusaki et al. | 310/90 |
| 6,357,916 B2 * | 3/2002 | Saeki et al. | 384/100 |
| 6,369,981 B2 * | 4/2002 | Nii et al. | 360/99.08 |
| 2002/0175577 A1 * | 11/2002 | Yoshitsugu et al. | 310/90 |
| 2003/0143086 A1 | 7/2003 | Shih | |
| 2003/0222522 A1 | 12/2003 | Chang | |
| 2004/0145260 A1 * | 7/2004 | Tamaoka et al. | 310/90 |
| 2005/0001495 A1 * | 1/2005 | Takahashi et al. | 310/90 |

* cited by examiner

*Primary Examiner*—Quyen Leung
*Assistant Examiner*—Alex W Mok
(74) *Attorney, Agent, or Firm*—Frank R. Niranjan

(57) ABSTRACT

A cooling fan includes a fan housing (30) having a central tube (34) extending upwardly thereof, a bearing (60) received in the central tube, a stator (20) mounted around the central tube, a rotor (10) including a hub (12) having a shaft (18) extending from the hub into the bearing, and a oil retaining ring (40) mounted around the shaft. A slot (180) is defined in a top end (182) of the shaft of the rotor near the hub to prevent the escaping oil from continuously creeping out along the shaft. The slot is located between the retaining ring and the bearing. The bearing has a plurality of channels (68) defined in an outer surface thereof, for guiding the escaping oil to return to an oil reservoir defined in a bottom of the central tube.

8 Claims, 5 Drawing Sheets

COOLING FAN

FIELD OF THE INVENTION

The present invention relates to a cooling fan, and more particularly relates to a cooling fan which has a motor with a bearing having good lubricating characteristics.

DESCRIPTION OF RELATED ART

With the continuing development of the electronic technology, electronic packages such as CPUs (central processing units) are generating more and more heat that is required immediate dissipation. Cooling fans are commonly used in combination with heat sinks for cooling CPUs. Cooling fan performance mostly depends on performance characteristics of bearings used. Good lubricating qualities of the bearings increases the life-span of the bearings.

Referring to FIG. 5, a conventional cooling fan comprises a rotor 1 having a shaft 2 extending downwardly from a central portion of the rotor 1, a bearing 3 defining an inner hole for receiving the shaft 2 therein, and a frame 4. A central tube 5 extends upwardly from a middle portion of the frame 4 and defines a through hole 7 therein. The bearing 3 impregnated with lubricant oil is secured in the through hole 7 of the central tube 5 to rotatably support the rotor 1. An oil retaining ring 6 is mounted around the shaft 2 and located above a top end of the bearing 3 when the cooling fan is assembled. A gap is defined between a circumferential surface of the oil retaining ring 6 and an inner circumference of a top end of the central tube 5. During operation of the cooling fan, the oil originating from the bearing 3 passes out through the gap and is lost. Lubrication of the bearing 3 is thus gradually diminished. The friction between the shaft 2 and the bearing 3 increases, resulting in noise or malfunctioning. Finally the performance of the cooling fan is reduced, and the life-span is resultingly shortened.

What is needed, therefore, is a cooling fan which can reduce or eliminate lubricant oil loss.

SUMMARY OF THE INVENTION

According to a preferred embodiment of the present invention, a cooling fan comprises a fan housing having a central tube extending upwardly thereof, a bearing received in the central tube, a stator mounted around the central tube, and a rotor including a hub having a shaft extending from the hub into the bearing. A slot is defined in a top end of the rotor near the hub. An oil retaining ring is mounted around the shaft and located above the slot of the shaft. An oil buffer is defined between the retaining ring and the bearing and communicates with the slot of the shaft. During operation of the cooling fan, the slot of the shaft prevents the escaping oil keep creeping out along the shaft. The escaping oil is received in the buffer and then flows back to an oil reservoir in a bottom of the central tube through channels defined in an outer surface of the bearing. Thus the oil can be kept from leaking out of the bearing. Good lubricating quality of the bearing and shaft is consistently maintained, thereby improving the quality and life-span of the cooling fan.

Other advantages and novel features of the present invention will be drawn from the following detailed description of the preferred embodiments of the present invention with attached drawings, in which:

BRIEF DESCRIPTION OF THE DRAWINGS

Many aspects of the present cooling fan can be better understood with reference to the following drawings. The components in the drawings are not necessarily drawn to scale, the emphasis instead being placed upon clearly illustrating the principles of the present cooling fan. Moreover, in the drawings, like reference numerals designate corresponding parts throughout the several views.

DETAILED DESCRIPTION OF THE INVENTION

Figure 1:
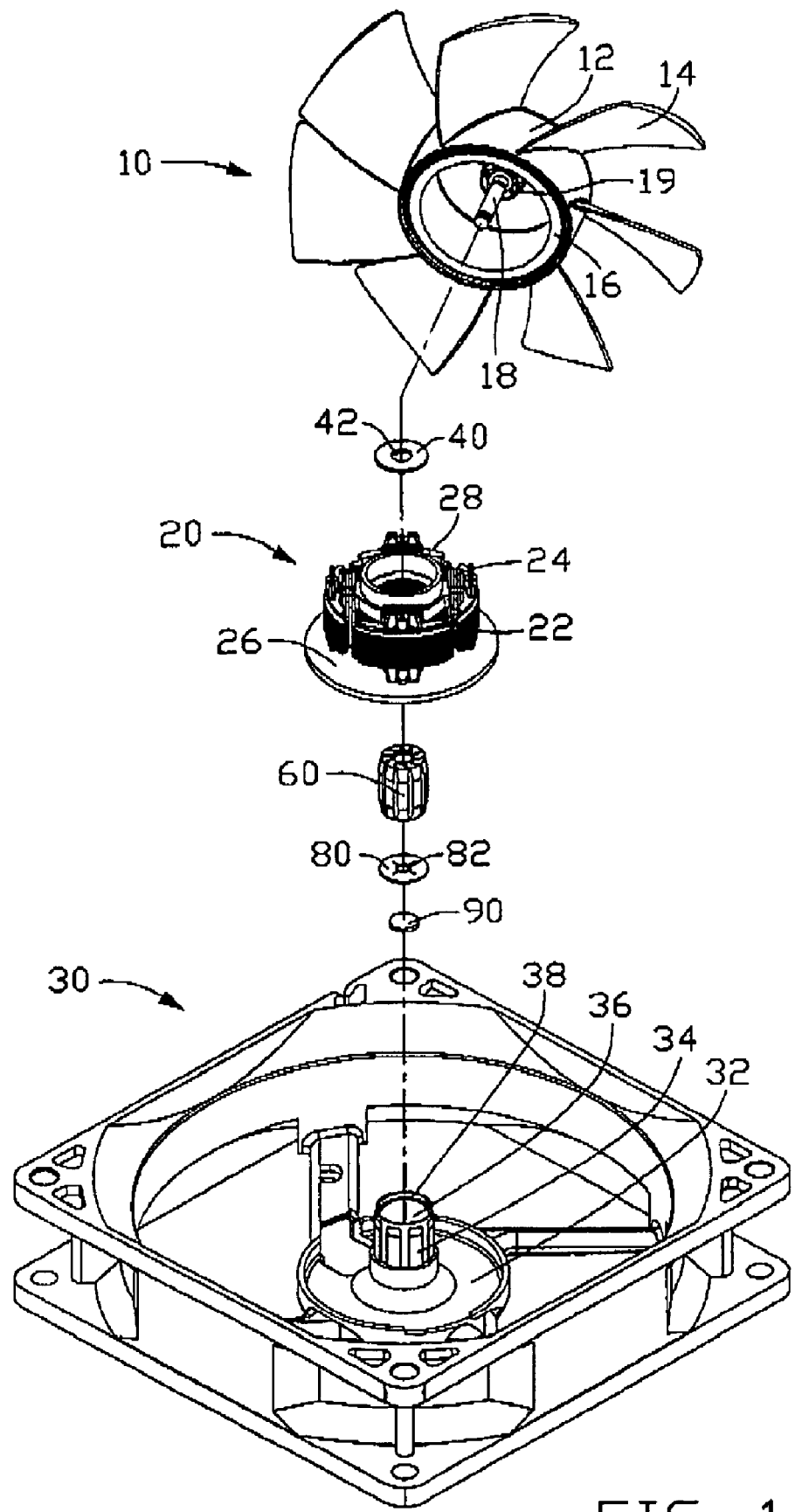
FIG. 1 is an isometric, exploded view of a cooling fan in accordance with a preferred embodiment of the present invention.
Figure 2:
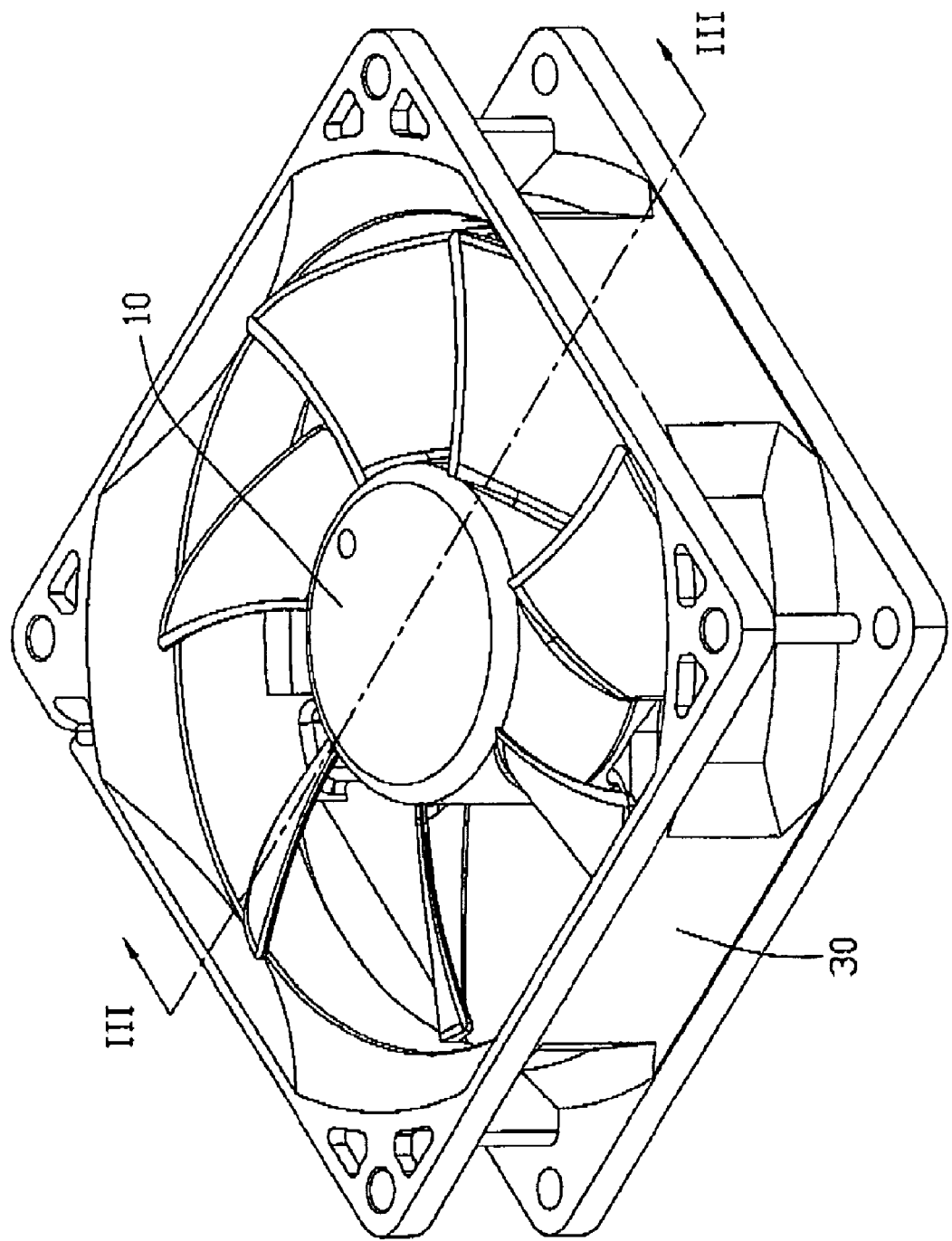
FIG. 2 is an isometric, assembled view of the cooling fan of FIG. 1.
Figure 3:
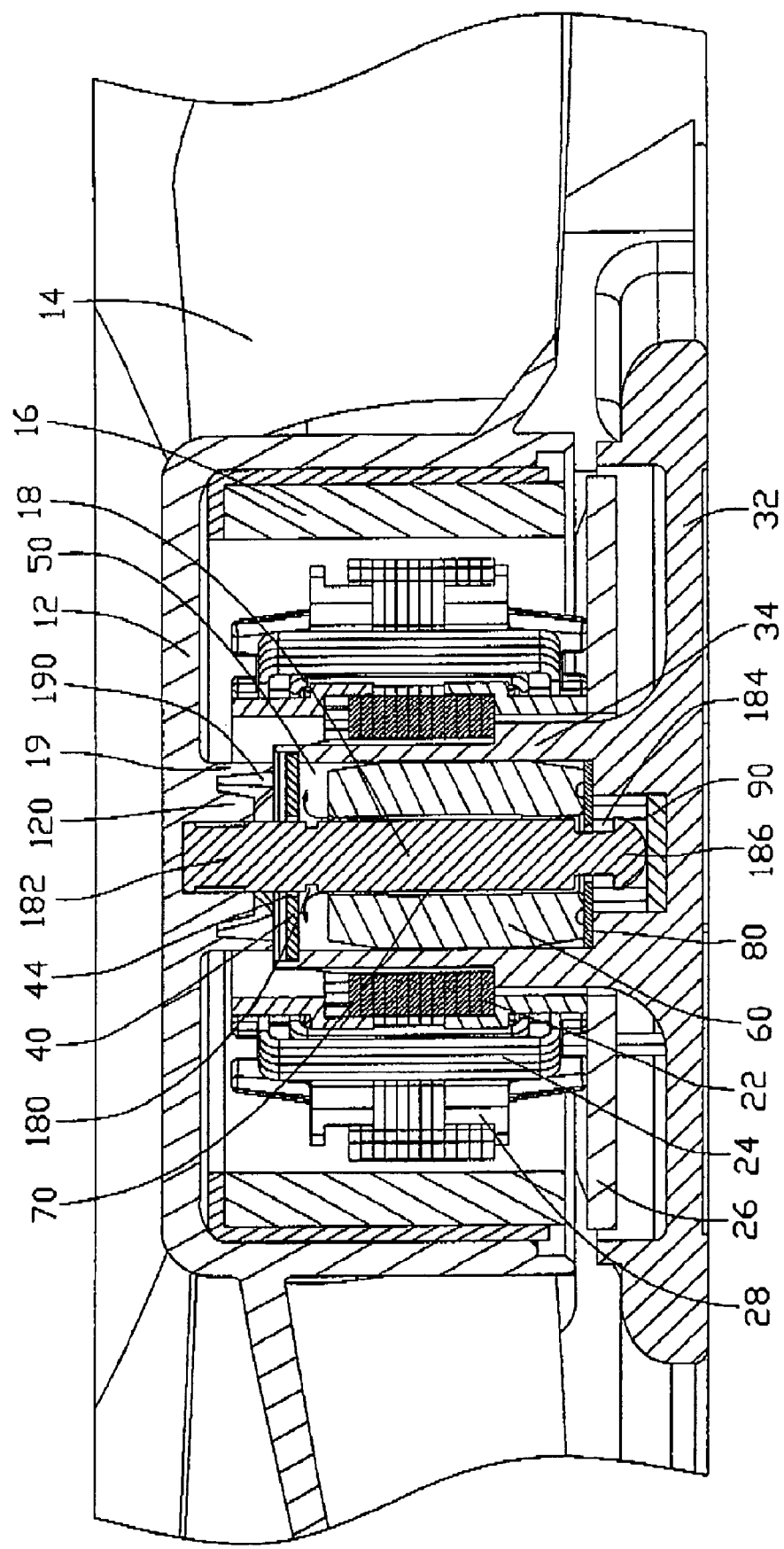
FIG. 3 is a cross sectional view of the cooling fan taken from line III-III of FIG. 2.
Figure 4:
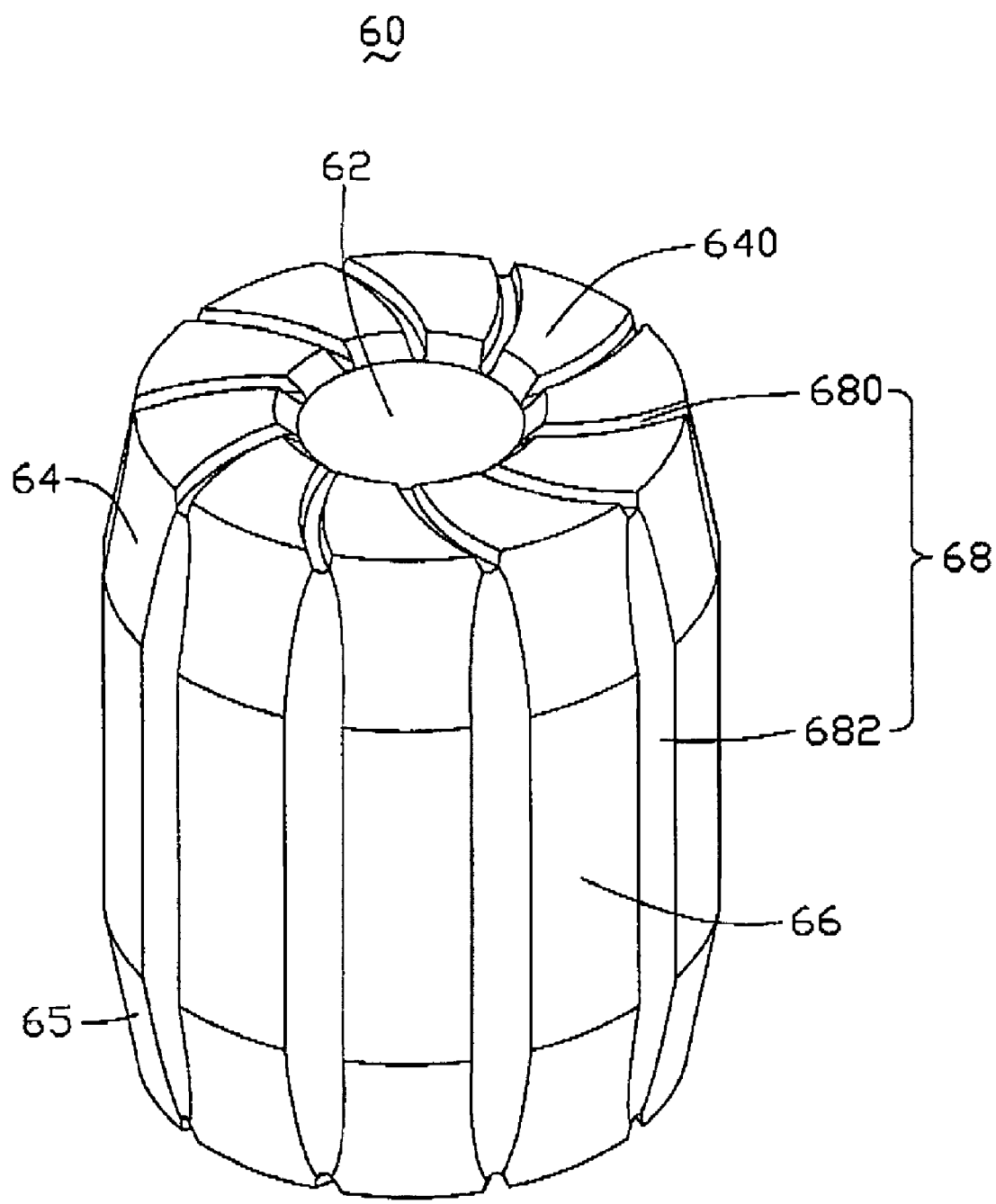
FIG. 4 is an enlarged view of a bearing of the cooling fan of FIG. 1.
Figure 5:
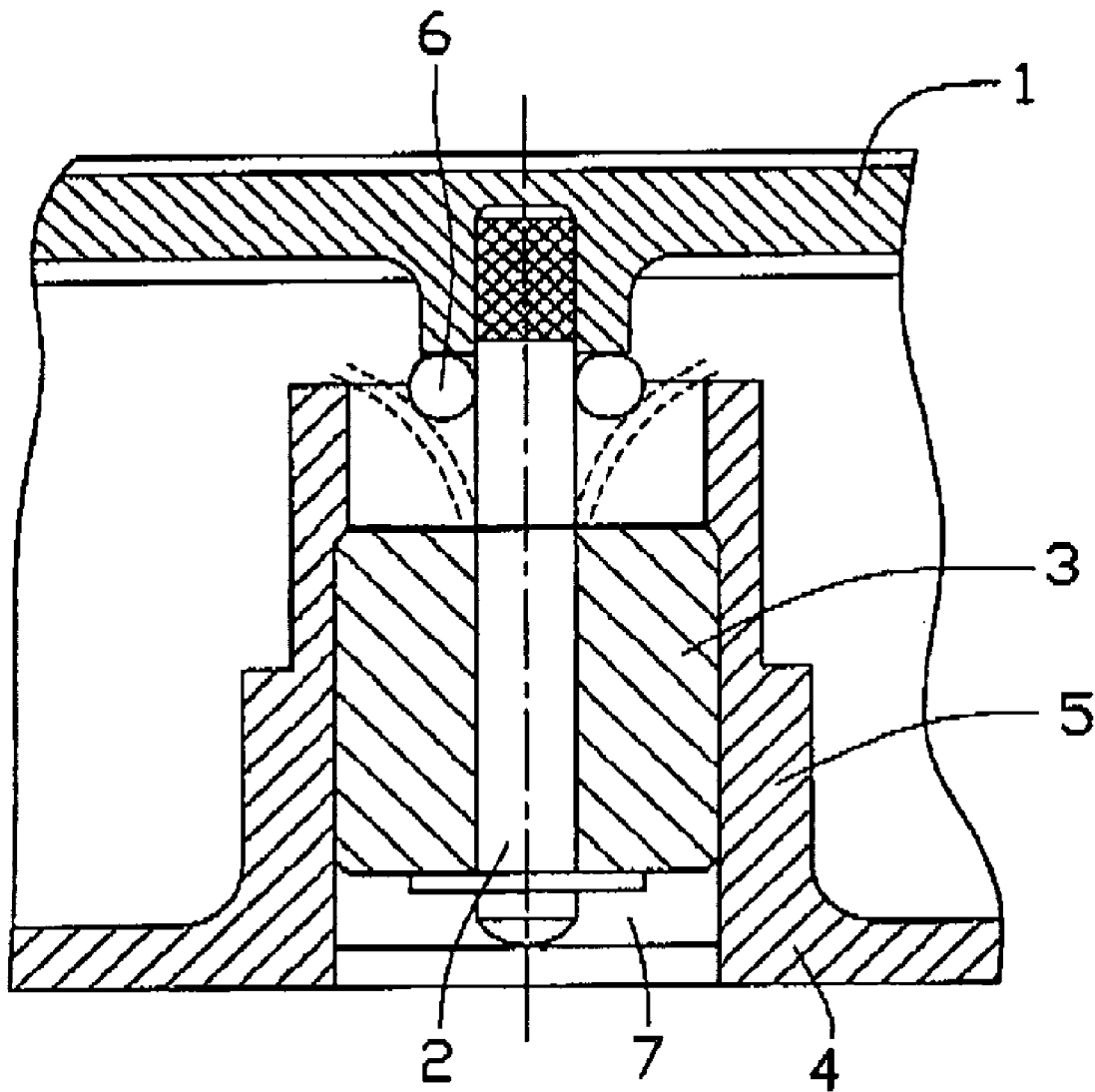
FIG. 5 is a cross sectional view of a conventional cooling fan.

Referring to FIGS. 1 through 4, a cooling fan according to a preferred embodiment includes a rotor 10, a stator 20 in respective to which the rotor 10 is rotatable, a fan housing 30 receiving the rotor 10 and the stator 20 therein, and an oil retaining ring 40 mounted in the fan housing 30.

The fan housing 30 comprises a base 32 and a central tube 34 extending upwardly from a central portion of the base 32. The central tube 34 defines a central hole 36 therein and forms an open end at a top portion thereof. An annular recess 38 is formed on an inner circumference of the top portion of the central tube 34. The recess 38 communicates with the central hole 36. Thus the top portion of the central tube 34 has an inner diameter larger than that of the other portion of the central tube 34.

The rotor 10 comprises a hub 12 forming a shaft seat 120 at a central portion thereof, a plurality of fan blades 14 extends radially from an outer periphery of the hub 12, a magnet 16 adhered to an inner surface of the hub 12, and a shaft 18 received in the shaft seat 120 extending downwardly from a central portion of the shaft seat 120. The shaft 18 defines an annular slot 180 in a circular circumference thereof, near a top end 182 adjacent to the hub 12. An annular notch 184 is defined near a free end 186 of the shaft 18 far from the hub 12. An annular protrusion 19 around the shaft seat 120 extends downwardly from the hub 12. The protrusion 19 has an outer diameter smaller than the inner diameter of the top portion of the central tube 34. The protrusion 19 and the shaft seat 120 cooperatively define an annular chamber 190 therebetween.

The stator 20 includes a stator core 22 consisting of layered yokes, stator coils 24 wound on the stator core 22 to establish an alternating magnetic field, and a PCB (Printed Circuit Board) 26 electrically connected with the stator coils 24. To avoid the coils 24 coming into electrical contact with the stator core 22, upper and lower insulating frames 28 are used to cover the stator core 22 and electrically insulate the stator coils 24 from the stator core 22.

The oil retaining ring 40 has an outer diameter approximately the same as the inner diameter of the top portion of the central tube 34 which defines the recess 38 therein. Thus the retaining ring 40 is received in the recess 38 and substantially encloses the open end of the central tube 34 when the cooling fan is assembled. The retaining ring 40 defines a mounting hole 42 in a middle portion for extension of the shaft 18 therethrough. The mounting hole 42 of the retaining ring 40 has a diameter approximately the same as or a little larger than the diameter of the shaft 18. In this embodiment, the diameter of the mounting hole 42 of the retaining ring 40 is larger than the diameter of the shaft 18. A narrow gap 44 with a width about 0.2 mm (Millimeter) is defined between an inner circumferential surface of the retaining ring 40 and an outer surface of the shaft 18. The gap 44 thus can avoid friction generated between the retaining ring 40 and the shaft 18 during operation of the cooling fan.

The cooling fan further includes a bearing 60 mounted in the central hole 36 of the central tube 34 via the open end. The bearing 60 defines an axial hole 62 therein for extension of the shaft 18 therethrough. The axial hole 62 of a middle portion of the bearing 60 has a diameter larger than that of two opposite ends (i.e. top and bottom ends 64, 65) of the bearing 60. Therefore a space 70 is defined between the middle portion of the bearing 60 and the shaft 18 when the fan is assembled. This space 70 can improve the supply of lubrication oil to the bearing 60. On the other hand, the middle portion of the bearing 60 is spaced from the shaft 18, whilst only the two ends 64, 65 of the bearing 60 contact with the shaft 18. The contacting area between the bearing 60 and the shaft 18 is thus reduced, thereby reducing the friction generated between the bearing 60 and the shaft 18. For reducing oil loss of the cooling fan, each of the two ends 64, 65 of the bearing 60 and the shaft 18 form a clearance of only 0.002~0.005 mm. A chamfer angle is formed at each of the ends 64, 65 of the bearing 60 for facilitating mounting of the bearing 60 in the central hole 36 of the central tube 34.

A plurality of channels 68 are defined in an outer surface of the bearing 60 for flowing back of the lubricant oil. The channels 68 communicate with the axial hole 62 of the bearing 60. Each of the channels 68 includes a first portion 680 defined in a top and a bottom end surfaces 640 of the two ends 64, 65 and a second portion 682 defined in an outside surface 66 of the bearing 60. The first portion 680 of the each channel 68 is curve shaped. In a vertical view, the first portion 680 of the top end surface 640 extends outwardly from the axial hole 62 to the outside surface 66 of the bearing 60 along an anti-clockwise direction as the rotation direction of the cooling fan. Alternatively, the first portion 680 of the channel 68 can extend along a clockwise corresponding to the rotation direction of the cooling fan when the cooling fan is rotated clockwise. The channels 68 can guide the leaking oil to return back to an oil reservoir (not labeled) defined in a bottom of the central tube 34.

When assembly, the stator 20 is mounted around the central tube 34. The bearing 60 is received in the central hole 36 of the central tube 34. The top end 64 of the bearing 60 is lower than the top portion of the central tube 34. The shaft 18 extends through the axial hole 62 of the bearing 60 and thus rotatably engages with the bearing 60. The stator 20, the rotor 10, the central tube 34, the oil retaining ring 40 and the bearing 60 construct a motor for the cooling fan. The slot 180 of the shaft 18 is located above the top end 64 of the bearing 60. The retaining ring 40 is received in the recess 38 of the top portion of the central tube 34 and is located above the slot 180 of the shaft 18. Thus the retaining ring 40 and the bearing 60 are located at two opposite sides of the slot 180. An oil buffer 50 is defined between the retaining ring 40 and the bearing 60. The oil buffer 50 communicates with the slot 180 of the shaft 18. A locking washer 80 is located between the bottom end 65 of the bearing 60 and the central tube 34. The locking washer 80 defines an inner hole 82 therein. The inner hole 82 has a diameter smaller than the diameter of the shaft 18, but larger than the diameter of the portion of the shaft 18 defining the notch 184. Thus the locking washer 80 is engaged in the notch 184 to limit movement of the shaft 18 along an axial direction thereof. A wear pad 90 made of high abrasion resistant material is mounted in a bottom end of the central hole 36 of the central tube 34 to face and supportively engage the free end 186 of the rotary shaft 18.

During operation, the rotor 10 is driven to rotate by the interaction of the alternating magnetic field established by the stator 20 and the magnetic field of the rotor 10. Due to the precision clearance formed between the two opposite ends of the bearing 60 and the shaft 18, the bearing 60 enables the cooling fan to run smoothly, stably and with less vibration. The lubrication oil creeps up along the rotating shaft 18 under the influence of the centrifugal force generated by the rotation of the shaft 18 and then escapes to the oil buffer 50 through the clearance defined between the top end 64 of the bearing 60 and the shaft 18. The slot 180 of the shaft 18 prevents the oil from continuously creeping up along the shaft 18. The retaining ring 40 can sufficiently prevent the oil from leaking out of the narrow gap 44. Thus the escaping oil is received in the buffer 50 and then flows back to the bearing 60 through the channel 68 of the bearing 60. Therefore the oil can be kept from leaking out of the bearing 60. Good lubrication of the bearing 60 and shaft 18 is thus consistently maintained, thereby improving the quality and life-span of the cooling fan.

It is understood that the invention may be embodied in other forms without departing from the spirit thereof. Thus, the present example and embodiment are to be considered in all respects as illustrative and not restrictive, and the invention is not to be limited to the details given herein.

What is claimed is:

1. A cooling fan comprising:
   a fan housing having a central tube extending upwardly therefrom, the central tube defining a central hole therein, and forming a recess in a top portion thereof, the recess communicating with the central hole, a diameter of the recess being greater than that of the central hole;
   a bearing impregnated with lubricant oil being received in the central hole of the central tube, an axial hole being defined in the bearing, a top end of the bearing being lower than a bottom of the recess of the central tube;
   a stator mounted around the central tube;
   a rotor comprising a hub having a shaft extending from the hub into the axial hole of the bearing, a slot being defined in a top end of the shaft near the hub, the bottom of the recess being higher than a top of the slot, and a bottom of the slot being higher than the top end of the bearing; and
   an oil retaining ring mounted around the shaft and being fixedly received in the recess of the central tube and abutting the bottom of the recess of the central tube, the slot of the shaft being located lower than a bottom of the retaining ring and higher than the top end of the bearing;
   wherein an oil buffer is defined among the shaft, the central tube, the bottom of the retaining ring and the top end of the bearing, and communicates with the slot, a depth of the oil buffer in an axial direction of the shaft being greater than that of the slot, the slot being configured for preventing lubricant oil which escapes from the bearing during operation of the cooling fan from continuously creeping up along the shaft.

2. The cooling fan of claim 1, wherein a gap is defined between an inner circumferential surface of the retaining ring and the shaft to avoid friction between the retaining ring and the shaft, the gap having a width not larger than 0.2 mm.

3. The cooling fan of claim 1, wherein a middle portion of the bearing has an inner diameter larger than that of two ends of the bearing, a clearance of 0.002~0.005 mm is formed between each of the two ends of the bearing and the shaft, and a space is defined between the middle portion of the bearing and the shaft for improving supply of lubricant oil to the bearing.

4. The cooling fan of claim 1, wherein a number of channels communicating with the axial hole of the bearing are defined in an outer surface of the bearing, each channel comprising a first portion defined in top and bottom end surfaces of the bearing and a second portion defined in an outside circumferential surface of the bearing, the first portion of the each channel extending outwardly from the axial hole to the outside circumferential surface of the bearing along a rotation direction of the cooling fan, the escaping lubricant oil flowing along the first portions of the channels of the top end surface of the bearing and then the second portion of the channels to a bottom end of the bearing.

5. The cooling fan of claim 4, wherein a bottom portion of the central tube is closed, and an reservoir is defined in the bottom portion of the central tube, the reservoir being lower than and communicating with the central hole of the central tube, the reservoir having a diameter smaller than that of the central hole, a step being formed at a bottom of the central hole for mounting the bearing thereon, the escaping oil flowing back to the bottom end of the bearing being received in the reservoir and then flowing back to the bearing along the first portions of the channels of the bottom end surface of the bearing.

6. The cooling fan of claim 5, wherein a locking washer is arranged between the step and the bottom end surface of the bearing, and a free end of the shaft far from the hub extends into the reservoir, an annular notch being defined in the shaft near the free end thereof, and the washer engaging into the notch of the shaft to limit axial movement of the shaft.

7. The cooling fan of claim 1, wherein the hub forms a shaft seat receiving the top end of the shaft therein, an annular protrusion around the shaft seat extending downwardly from the hub, the protrusion having an outer diameter smaller than the diameter of the recess, the protrusion and the shaft seat cooperatively defining an annular chamber therebetween.

8. The cooling fan of claim 7, wherein a bottom of the protrusion is lower than a bottom of the shaft seat, and higher than the oil retaining ring, the protrusion being spaced from the oil retaining ring in the axial direction of the shaft, and being spaced from a top of the central tube in a radial direction of the shaft.

* * * * *